(12) United States Patent
Macey et al.

(10) Patent No.: US 11,884,376 B2
(45) Date of Patent: Jan. 30, 2024

(54) LANDING APPARATUS FOR AN AIR VEHICLE

(71) Applicant: Hybrid Air Vehicles Limited, Bedford (GB)

(72) Inventors: Paul Macey, Langport (GB); Michael Durham, Bedford (GB)

(73) Assignee: HYBRID AIR VEHICLES LIMITED, Bedford (GB)

( * ) Notice: Subject to any disclaimer, the term of this patent is extended or adjusted under 35 U.S.C. 154(b) by 102 days.

(21) Appl. No.: 17/626,758

(22) PCT Filed: Jul. 14, 2020

(86) PCT No.: PCT/GB2020/051695
§ 371 (c)(1),
(2) Date: Jan. 12, 2022

(87) PCT Pub. No.: WO2021/009507
PCT Pub. Date: Jan. 21, 2021

(65) Prior Publication Data
US 2022/0315196 A1     Oct. 6, 2022

(30) Foreign Application Priority Data
Jul. 16, 2019 (GB) ........................ 1910197

(51) Int. Cl.
*B64B 1/00*     (2006.01)
*B60V 3/08*     (2006.01)

(52) U.S. Cl.
CPC ............... *B64B 1/005* (2013.01); *B60V 3/08* (2013.01)

(58) Field of Classification Search
CPC ........... B64B 1/005; B64B 1/68; B64C 25/56; B64D 25/18; B60V 3/08
See application file for complete search history.

(56) References Cited

U.S. PATENT DOCUMENTS

| | | | |
|---|---|---|---|
| 1,694,873 A | 12/1928 | Brunner | |
| 2,955,785 A * | 10/1960 | Smith | B64C 35/00 244/102 R |

(Continued)

FOREIGN PATENT DOCUMENTS

| | | | |
|---|---|---|---|
| CN | 202379086 | 11/2020 | |
| EP | 0291355 A2 * | 11/1988 | ............... B60V 3/08 |

(Continued)

OTHER PUBLICATIONS

Patent Cooperation Treaty, "International Search Report", Int'l Application No. PCT/GB2020/051695, dated Nov. 12, 2020, 3 pages.

(Continued)

*Primary Examiner* — Joseph W Sanderson
(74) *Attorney, Agent, or Firm* — Clement A. Berard, Esq.; Dann, Dorfman, Herrell & Skillman, PC

(57) ABSTRACT

A landing apparatus for an airship or hybrid air vehicle. The landing apparatus comprises a hollow, non-toroidal, flexible enclosure (103), having a substantially vertical axis (104), and a substantially circular cross-section centred on the axis. A base (122) of the enclosure is arranged to contact the ground. The enclosure (103) is inflatable with air or gas for landing, and deflatable for retraction of the enclosure during flight.

17 Claims, 5 Drawing Sheets

(56) References Cited

U.S. PATENT DOCUMENTS

| | | | | |
|---|---|---|---|---|
| 3,004,737 | A * | 10/1961 | Lehberger | B64C 25/56 244/105 |
| 3,524,517 | A | 8/1970 | Fleur | |
| 3,595,336 | A * | 7/1971 | Perez | B60V 3/08 180/128 |
| 3,738,597 | A * | 6/1973 | Earl | B64C 25/56 180/129 |
| 3,802,602 | A * | 4/1974 | Wilson | B60V 3/08 180/128 |
| 3,807,524 | A * | 4/1974 | Taylor | B60V 3/08 180/119 |
| 3,869,103 | A * | 3/1975 | Nelson | B60V 3/08 244/100 R |
| 7,040,572 | B2 * | 5/2006 | Munk | B64B 1/02 244/30 |
| 7,954,752 | B2 * | 6/2011 | Smith | B64D 25/18 244/100 A |
| 8,016,229 | B2 * | 9/2011 | Greiner | B60V 3/08 244/30 |
| 8,177,161 | B2 * | 5/2012 | Morehead | B64B 1/32 244/30 |
| 8,783,602 | B2 * | 7/2014 | Morehead | B64C 25/56 244/30 |
| 8,864,068 | B1 * | 10/2014 | Pasternak | B64B 1/005 244/101 |
| 9,132,904 | B2 | 9/2015 | Durham | |
| 9,573,666 | B2 * | 2/2017 | Rivault | B64D 25/18 |
| 9,592,906 | B2 | 3/2017 | Durham | |
| 10,195,791 | B1 * | 2/2019 | Reeves, Jr. | B64D 25/14 |
| 2005/0082426 | A1 * | 4/2005 | Munk | B64B 1/005 244/100 A |
| 2010/0001128 | A1 * | 1/2010 | Morehead | B60V 3/08 244/100 A |
| 2010/0044507 | A1 * | 2/2010 | Smith | B64D 25/18 244/110 R |
| 2010/0140388 | A1 * | 6/2010 | London | B60V 3/08 60/229 |
| 2010/0230533 | A1 * | 9/2010 | Greiner | B64B 1/60 244/30 |
| 2012/0043416 | A1 | 2/2012 | Morehead et al. | |
| 2013/0270387 | A1 * | 10/2013 | Morehead | B64B 1/005 244/30 |
| 2015/0083856 | A1 * | 3/2015 | Durham | B60V 1/043 244/100 A |
| 2020/0070963 | A1 * | 3/2020 | Christian | B32B 7/09 |
| 2022/0227469 | A1 * | 7/2022 | Durham | B64B 1/40 |

FOREIGN PATENT DOCUMENTS

| | | | | |
|---|---|---|---|---|
| EP | 2851251 | | 3/2015 | |
| GB | 2445744 | | 7/2008 | |
| KR | 101135167 | B1 * | 4/2012 | B60V 1/08 |
| WO | WO-2012121467 | A1 * | 9/2012 | B60V 1/08 |
| WO | 2020-229800 | | 11/2020 | |

OTHER PUBLICATIONS

UK Intellectual Property Office, "Search Report", Application No. GB 1910197.1, dated Dec. 18, 2019, 1 page.

* cited by examiner

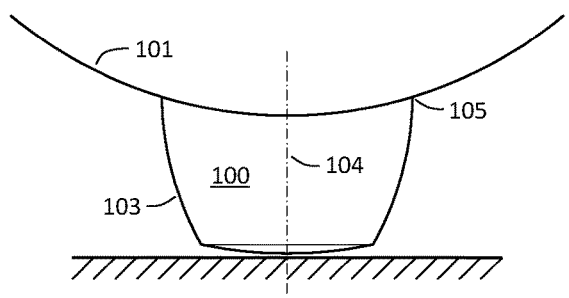
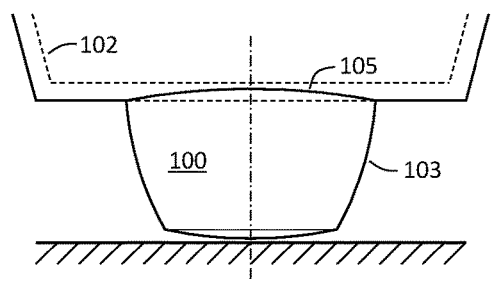
Fig. 1A
Fig. 1B
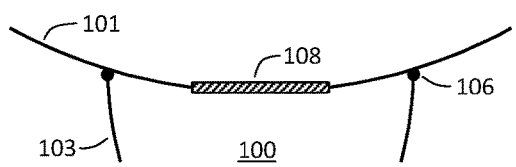
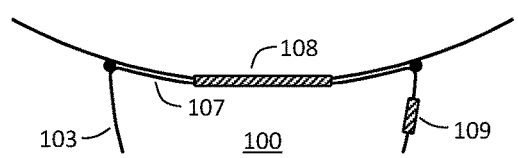
Fig. 2A
Fig. 2B
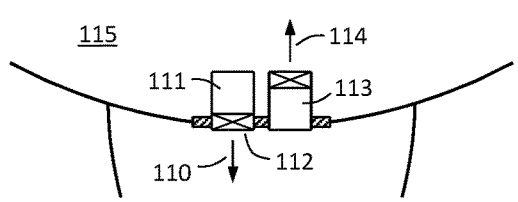
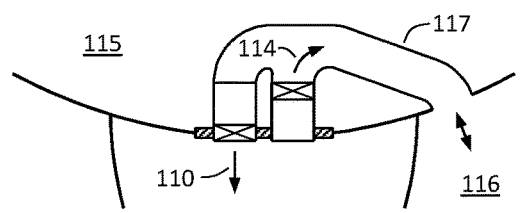
Fig. 3A
Fig. 3B

LANDING APPARATUS FOR AN AIR VEHICLE

This Application is the U.S. National Phase under 35 U.S.C. § 371 of PCT Application No. PCT/GB2020/051695 filed 14 Jul. 2020, entitled "LANDING APPARATUS FOR AN AIR VEHICLE", which claims the priority of Great Britain Application No. GB 1910197.1 filed 16 Jul. 2019; this U.S. National Phase Application claims the priority of each of the foregoing applications which are hereby incorporated herein by reference in their entireties.

BACKGROUND TO THE INVENTION

This invention relates to a landing apparatus for an air vehicle, such as an airship or hybrid air vehicle, and to an air vehicle having the landing apparatus.

A number of landing systems for airships and hybrid air vehicles have been proposed, generally with the aim of avoiding the need to moor the vehicle to a mast with the aid of a large ground crew.

US 2012/0043416 A1 and EP 2851251 A1 are both concerned with retractable air cushioned landing systems that allow the air vehicle to taxi like a hovercraft. Toroidal skirts define a central plenum, open to the ground.

The Airlander® is described at https://www.hybridairvehicles.com/aircraft/airlander-10. This aircraft includes two simple elongated air-filled skids, with horizontal axes, one on each of its hull lobes. It also features two generally cylindrical, flexible air-filled structures with vertical axes, with rounded lower extremities, one on either side of its cockpit. Neither the skids nor the cylindrical structures are retractable during flight.

SUMMARY OF THE INVENTION

From one aspect, the present invention provides a landing apparatus for an airship or hybrid air vehicle, the landing apparatus comprising a hollow, non-toroidal, flexible enclosure, having a substantially vertical axis, and a substantially circular cross-section centred on said axis, a base of the enclosure being arranged to contact the ground, the enclosure being inflatable with air or gas for landing, and deflatable for retraction of the enclosure during flight.

In embodiments of the invention, the inflated enclosure has a shape that is substantially that of a truncated cone, tapering towards the base, which is substantially flat.

An upper edge of the enclosure may be shaped to conform to a curved hull surface. The base may be provided with reinforcing elements. One possible reinforcing element comprises an inflated ring arranged at the periphery of the base, for example inside the enclosure. Another possible reinforcing element comprises a shoe for protecting the underside of the base, for example in the form of a ring at the periphery of the base, or a disc extending over the area of the base.

The base may be provided with one or more wheels. Alternatively, the base may be provided with a skirt for hovering and/or suck-down operation.

In one embodiment, a blower or compressed air reservoir is provided for inflation of the enclosure. Alternatively, an inlet valve may be provided for passive inflation of the enclosure from a ballonet.

A fan may be provided for deflation and retraction of the enclosure. A suction line and a valve may be provided to regulate the pressure within the retracted enclosure.

It will generally be advantageous to twist the enclosure during retraction, to provide predictability in its folding. Accordingly, the apparatus may include a plurality of tensioning devices, each extending helically from an upper circumferential location of the enclosure to a lower circumferential location, to rotate the base during retraction of the enclosure. The tensioning devices may comprise bungees or springs, or ropes, cables or chains provided with a winch or other withdrawing mechanism. They may be located inside or outside the enclosure.

The invention also provides an air vehicle having a plurality of landing apparatuses, each as described above. The air vehicle may include ballonets communicating with the enclosures, for inflation thereof with air. In exemplary embodiments, the landing apparatuses are arranged in port and starboard rows that are parallel to an axis of the vehicle.

BRIEF DESCRIPTION OF THE DRAWINGS

The invention will now be described in more detail, by way of example only, with reference to the accompanying drawings, in which:

FIGS. 1A and 1B are views of a landing apparatus according to an embodiment of the invention, secured to respective different aircraft elements;

FIGS. 2A and 2B show methods of attaching the enclosure to the hull;

FIGS. 3A and 3B show schematically how the enclosure can be inflated and deflated;

DETAILED DESCRIPTION OF PARTICULAR EMBODIMENTS

Figure 4:
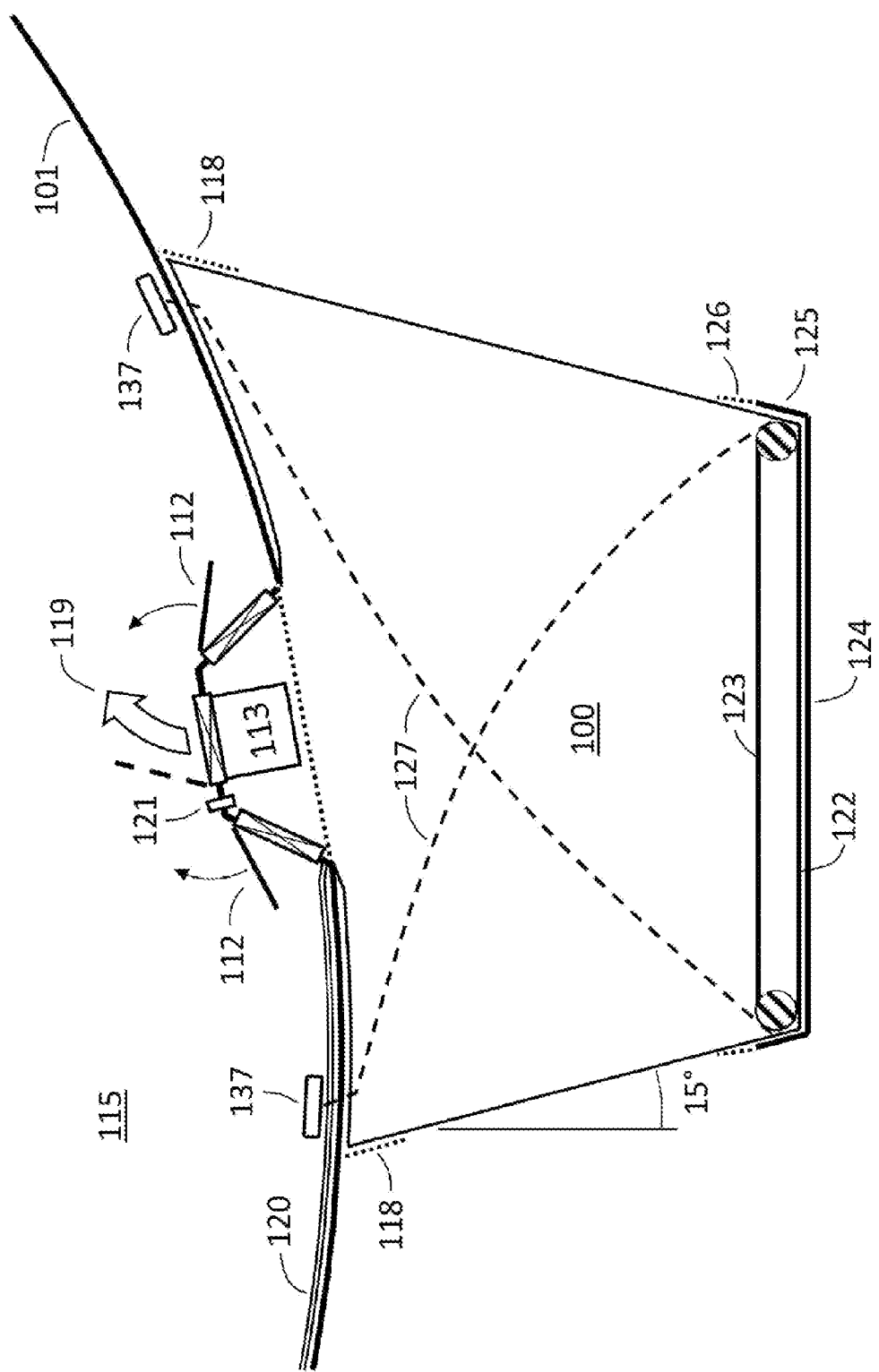
FIG. 4 is a schematic vertical section showing an embodiment of the landing apparatus in more detail.

According to the invention, an aircraft is provided with a plurality of flexible, inflatable landing gear units, which may for example have a diameter of a few metres. In a particular embodiment, a hybrid air vehicle is provided with port and starboard rows of the units, parallel to an axis of the vehicle. For example, there may be six units, with three units in each row, one pair of units being at forward location and two pairs at a rearward location.

FIG. 1A shows a landing unit 100, inflatable with air and appended directly to the underside of aircraft's pressure stabilised envelope 101. FIG. 1B shows the unit 100 secured instead to one of the aircraft's rigid structural elements 102. Each inflatable unit 100 comprises a flexible membrane configured as a closed body of revolution 103 oriented about a vertical axis 104, with the uppermost edge 105 shaped to conform to, and securely attached to, the underside of the aircraft.

FIG. 2A shows how the outboard face of each inflatable landing unit 100 may terminate along the attachment line to the aircraft with a gas tight joint 106. Alternatively, as shown in FIG. 2B, the flexible membrane may extend inboard of the attachment line to form a circular top face abutting against the underside of the aircraft 107. The membrane structure features one or more interfaces with the underside of the parent aircraft 108 or the external atmosphere 109.

FIG. 3A shows inflation 110 of the landing unit by a fan, blower, or compressed air reservoir 111, of which more than one may be provided. An inline shut-off valve 112 causes a one-way flow of air. An additional fan or blower 113 is arranged to act in an opposing direction 114 to remove air from the interior of the landing gear unit and is also provided with a shut-off valve. In this example, the air used to inflate and deflate the landing gear unit is drawn from the parent aircraft's internal volume 115.

FIG. 3B shows an alternative arrangement in which the air is obtained from the external atmosphere 116. The landing gear units may be fed directly through one or more openings in their membrane structure or, as shown, from a remote location via a length of ducting or feed pipe 117.

FIG. 4 shows an embodiment of the landing unit 100 generally in the form of truncated cone tapering downwardly, and in this example having generatrices at an angle of 15° to the vertical. The unit is attached to the pressure stabilised envelope 101 of an air vehicle, by means of lacing 118 extending around the upper periphery of the unit. In this example, the unit is inflated passively with air from a ballonet 115 located inside the envelope, via the opening of two valves 112. Thus, the landing units 100 is arranged to operate at a static inflation pressure that coincides with the pressure of the air ballonet.

In order to retract the unit 100, it is deflated using a fan 113 which returns air 119 to the ballonet. A suction line 120 maintains the unit in the retracted state, operating in conjunction with a pressure relief valve 121.

The base 122 of the unit 100 is made sufficiently rigid so that it will remain flat during retraction, whilst retaining sufficient compliancy to accommodate deflections resulting from ground loads. In this embodiment, this is achieved by means of a ring 123, inflated with air at high pressure to maintain its rigidity and that of the base 122, either permanently or during retraction only.

A wear-resistant shoe 124 covers the underside of the base 122. This may, for example, be formed of a fabric reinforced with ceramic platelets or another low-friction material. The shoe may be formed from a circle of fabric, having a diameter larger than that of the base 122. Radial slits may be formed at the circumference of the circle, the diametrical distance between two opposing slits corresponding to the diameter of the base 122. Such slits form a plurality of tabs 125 at the circumference of the shoe 124, which tabs can be bent upwards around the side of the unit 100 and laced thereto by lacing 126.

As an alternative to the stiffening ring 123 and/or the shoe 124, the flexible material of the base 122 itself can be reinforced to provide the necessary resilience and stiffness.

Figures 5A, 5B, 5C, 5D, 5E:
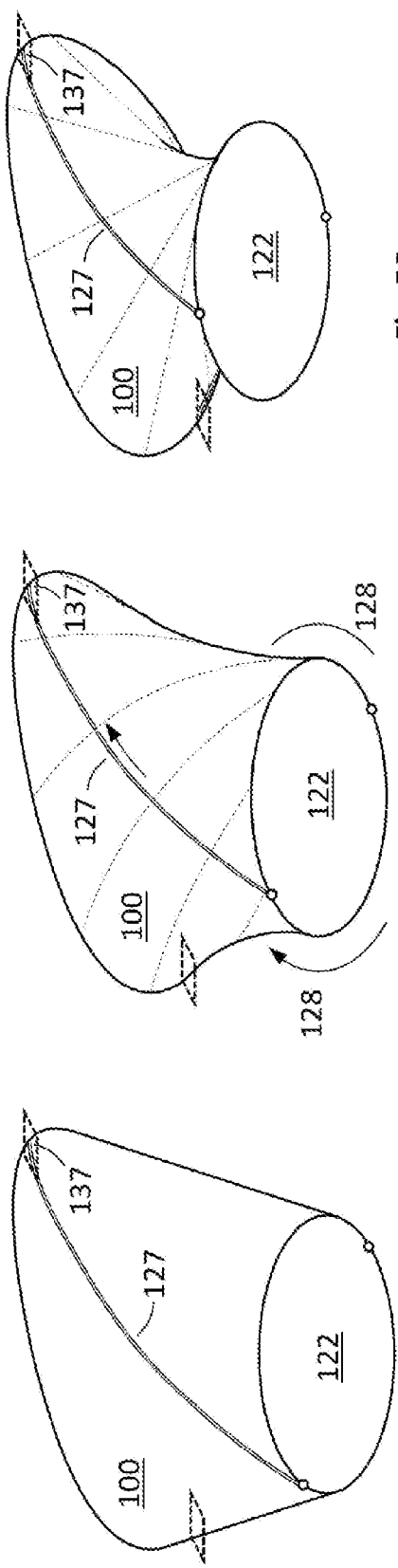
FIGS. 5A to 5E show retraction of the apparatus.

FIGS. 5A to 5E show how retraction and stowing of the unit 100 can be performed. FIG. 5A shows the shape of the unit when fully inflated. A series of tensioning devices 127, shown in FIGS. 5B to 5E, are provided. These are connected to the periphery of the base at intervals therealong and extend helically upwards around the curved surface of the unit, either on its inside or outside. They may be elastic devices such as bungees or springs, which are attached to the upper periphery of the unit 100 and are maintained at a maximum useful length by the inflated unit. Alternatively, the tensioning devices 127 may comprise cords, cables or chains capable of being drawn upwardly, for example by means of one of more winches 137 located in or on the hull of the air vehicle.

As the unit 100 is retracted, and its internal pressure reduces, the tensioning devices 127 impose a torque 128 on the base 122, causing it to rotate about the axis of the unit. The torque 128 is applied symmetrically around the base, which ensures that the base remains centred during retraction, even if the unit 100 is exposed to aerodynamic drag 129 or an uneven gravitational load. Eventually, as shown in FIG. 5E, the base 122 is aligned with the underside of the hull of the air vehicle, with the collapsed sidewall of the unit 130 folded between the hull and the base 122 in a controlled and consistent manner.

On re-inflation of the landing unit 100, the base 122 rotates in the opposite direction, the tensioning devices 127 return to their maximum useful lengths and the unit assumes the shape shown in FIG. 5A.

The combined contact footprint area of the landing units may be sized to react ground loads with sufficiently modest inflation pressure to enable aircraft operation on unprepared surfaces, such as vegetation, loosely compacted soil, sand, gravel, water, snow or ice.

Figure 6:
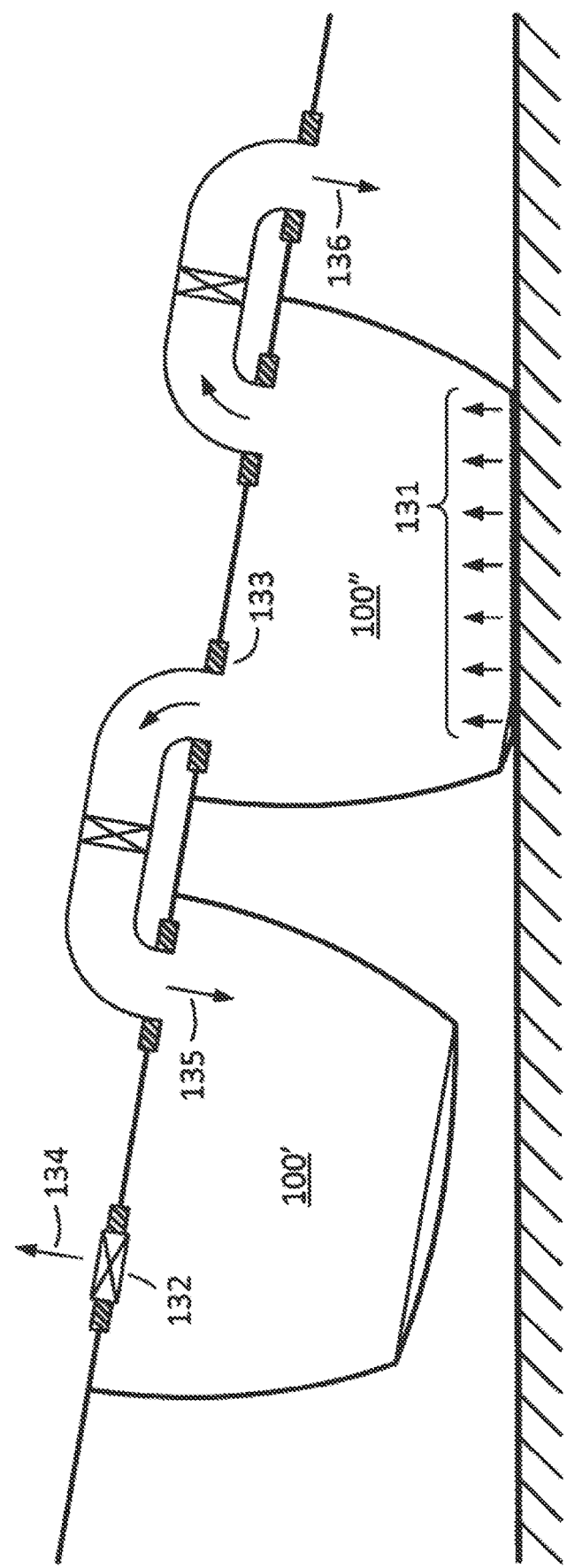
FIG. 6 shows a pair of landing apparatuses with an air venting system.

FIG. 6 shows a pair of landing units 100', 100", in a situation in which only the right-hand unit 100" is subjected to a ground load 131. The inflatable volume formed by each landing unit may be selectively vented through valves 132 or orifices 133 to regulate response to the ground load 131. These venting paths may optionally be arranged to exhaust air back into the parent aircraft's interior volume 134, or to an adjacent landing gear unit 135, or to the external atmosphere 136. By reducing the volume of the right-hand unit 100", descent energy is absorbed and the ground clearance of the aircraft is reduced.

Figure 7A:
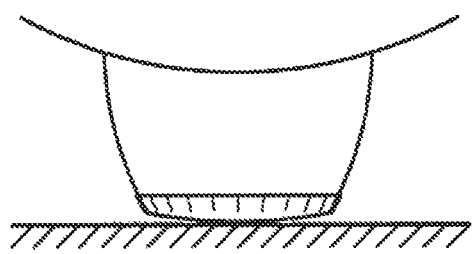
FIGS. 7A to 7F show accessories and landing modes for the apparatus.
Figure 7B:
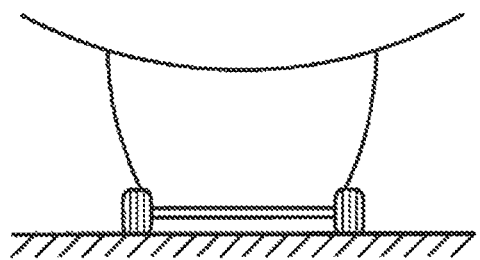
Figure 7C:
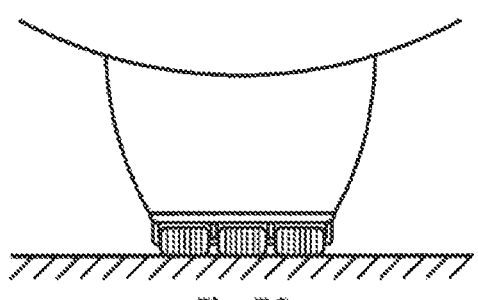
Figure 7D:
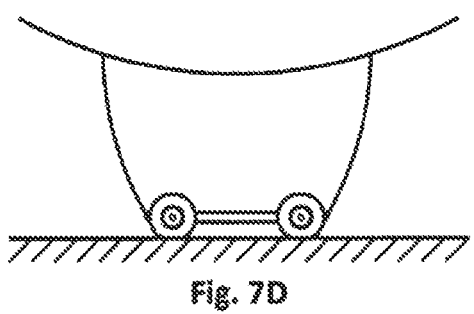
Figure 7E:
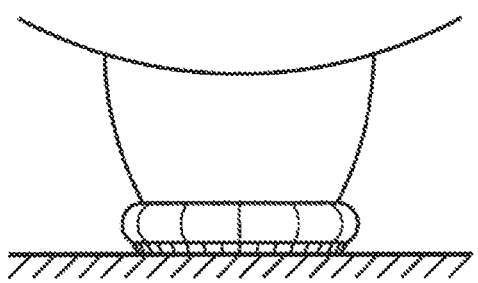
Figure 7F:
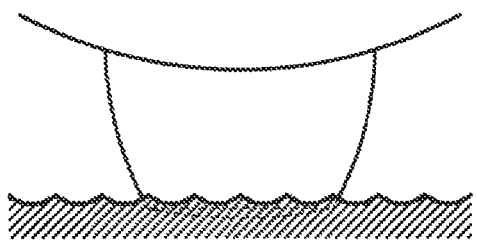

The underside of landing units may optionally be configured with wear resistant skid material as mentioned above (FIG. 7A), or wheels (FIG. 7B) or rollers (FIG. 7C), for forward/rearward taxiing. Alternatively, the wheels or rollers aligned in a lateral direction (FIG. 7D), to enable the parent aircraft to pivot freely about a ground mooring mast to align with the prevailing wind direction. The underside surfaces of landing gear units may alternatively be configured with an air cushion landing system (FIG. 7E), which may operate in both hover (floatation) and reverse (suckdown) modes, or they may displace sufficient volume to enable aircraft operation on water (FIG. 7F).

The landing apparatus of the invention provides a controlled ground clearance, whilst also allowing controlled retraction of the landing apparatus into an aerodynamic profile.

The invention claimed is:

1. A landing apparatus for an airship or hybrid air vehicle, the landing apparatus comprising:
    a hollow, non-toroidal, flexible enclosure, having a substantially vertical axis, and a substantially circular cross-section centered on said axis, a base of the enclosure being arranged to contact the ground, the enclosure being inflatable with air or gas for landing, and deflatable for retraction of the enclosure during flight; and
    a plurality of tensioning devices, each extending helically from an upper circumferential location of the enclosure to a lower circumferential location, to rotate the base during retraction of the enclosure.

2. A landing apparatus according to claim 1, wherein the inflated enclosure has a shape that is a truncated cone, tapering towards the base, which is flat when not deflected.

3. A landing apparatus according to claim 1, wherein an upper edge of the enclosure is shaped to conform to a curved hull surface.

4. A landing apparatus according to claim 1, wherein the base is provided with at least one reinforcing element.

5. A landing apparatus according to claim 4, wherein the at least one reinforcing element comprises an inflated ring arranged at a periphery of the base.

6. A landing apparatus according to claim 4, wherein the at least one reinforcing element comprises a shoe for protecting the underside of the base.

7. A landing apparatus according to claim 6, wherein a part of the shoe when not deflected is in the form of a disc extending over the base.

8. A landing apparatus according to claim 1, wherein the base is provided with one or more wheels.

9. A landing apparatus according to claim 1, wherein the base is provided with a skirt for hovering or suck-down operation or for both hovering and suck-down operation.

10. A landing apparatus according to claim 1, wherein a blower or compressed air reservoir is provided for inflation of the enclosure.

11. A landing apparatus according to claim 1, wherein an inlet valve is provided for passive inflation of the enclosure from a ballonet.

12. A landing apparatus according to claim 1, wherein a fan is provided for deflation and retraction of the enclosure.

13. A landing apparatus according to claim 1, wherein the tensioning devices comprise bungees or springs, or ropes, cables or chains provided with a winch.

14. A landing apparatus according to claim 1, wherein the tensioning devices are located inside the enclosure.

15. An air vehicle having a plurality of landing apparatuses, each according to claim 1.

16. An air vehicle according to claim 15, including a pressure-stabilised envelope containing ballonets that communicate with the enclosures, for inflation thereof with air.

17. An air vehicle according to claim 15, wherein the landing apparatuses are arranged in port and starboard rows that are parallel to an axis of the vehicle.

* * * * *